Dec. 26, 1967  R. W. YOUNG  3,359,842
APPARATUS FOR SLITTING METAL FOIL
Filed June 30, 1965  3 Sheets-Sheet 1

INVENTOR
ROGER W. YOUNG
BY
Rudolph J. Jerick
ATTORNEY

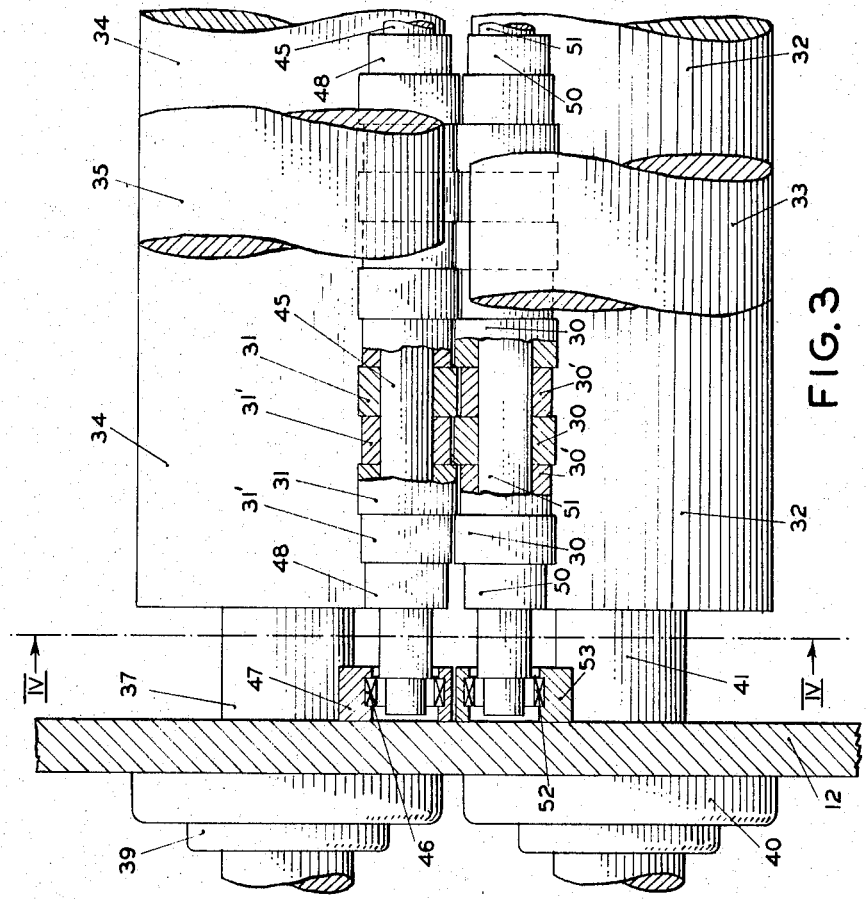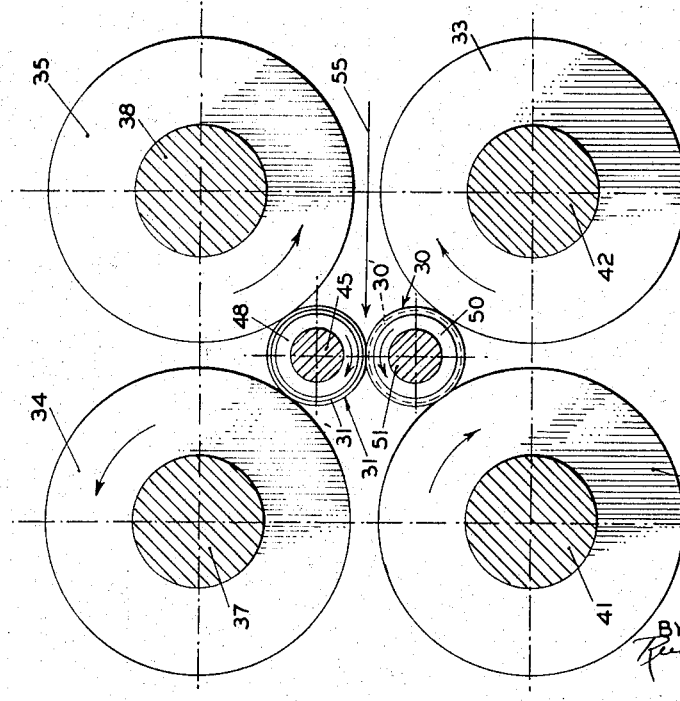

Dec. 26, 1967  R. W. YOUNG  3,359,842
APPARATUS FOR SLITTING METAL FOIL
Filed June 30, 1965  3 Sheets-Sheet 3
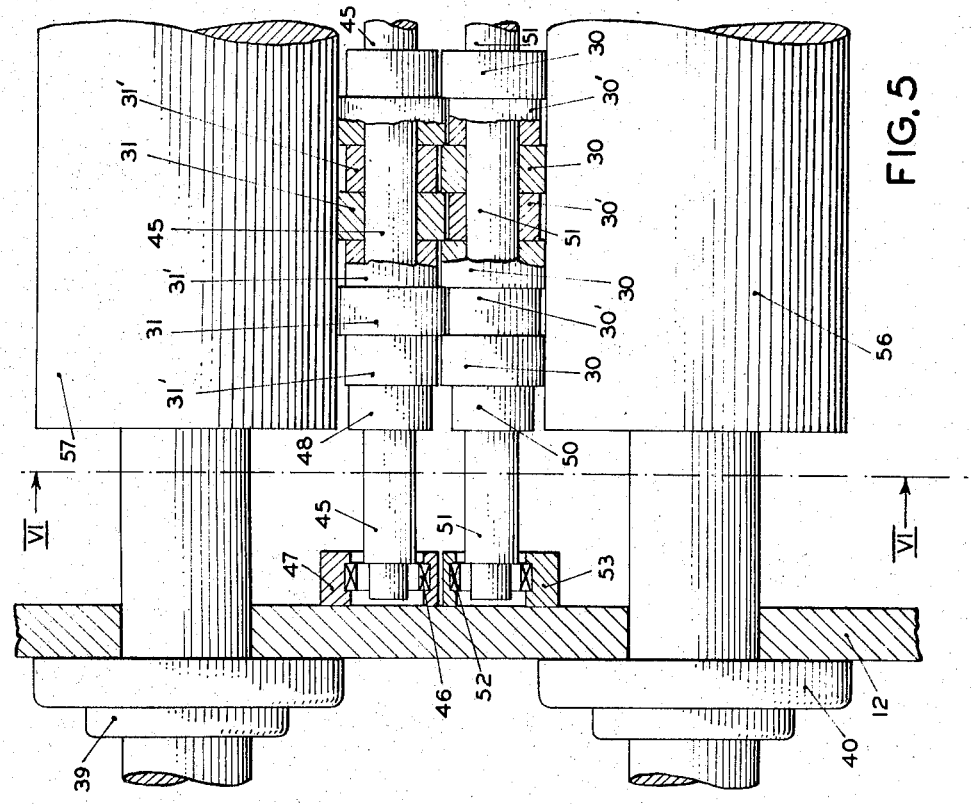
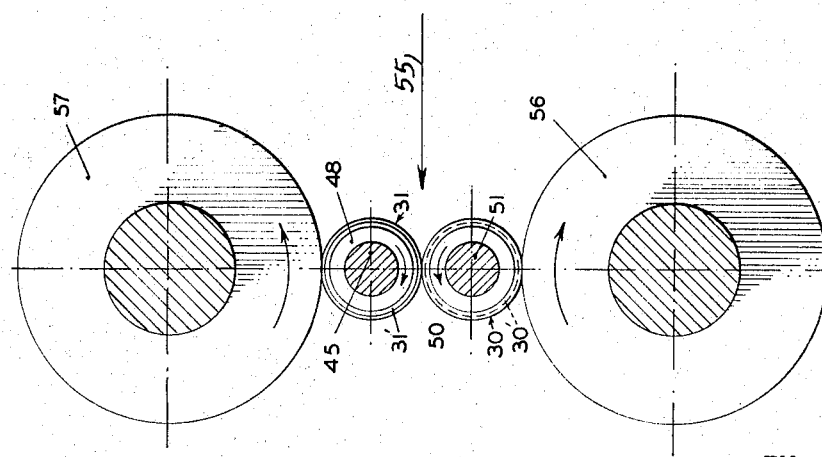
INVENTOR
ROGER W. YOUNG
BY
ATTORNEY United States Patent Office 3,359,842
Patented Dec. 26, 1967

3,359,842
APPARATUS FOR SLITTING METAL FOIL
Roger W. Young, Upper Montclair, N.J., assignor to John Dusenbery Company, Inc., Clifton, N.J., a corporation of New Jersey
Filed June 30, 1965, Ser. No. 468,336
6 Claims. (Cl. 83—500)

ABSTRACT OF THE DISCLOSURE

Foil slitting apparatus having cutting wheels and spacers alternately disposed on two, spaced shafts, the cutting wheels and spacers carried by the one shaft being aligned respectively with the spacers and the cutting wheels carried by the other shaft. Driven back-up rolls, in peripheral engagement with the cutting wheels, urge the two sets of wheels toward each other to maintain a minimum, constant overlap of the cutting wheels, thereby to minimize deformation of the foil during the slitting operation.

---

This invention relates to slitting apparatus and more particularly to improved apparatus for slitting metal foil and sheet, which apparatus affords economy of manufacture and minimizes deformation of the material during the slitting operation.

Heretofore, various types of slitting, or shearing apparatus has been used for the continuous cutting of metal foil or metal laminates in sheet or roll form. Present slitting arrangements employ large diameter, heavy rotating shafts which support the cutting knives or wheels in order to minimize shaft deformation during the cutting operation. With such large shafts and cutting wheels fabricated to very close tolerances, a small overlap of the cutting wheels can be maintained, but such construction is costly. If small diameter shafts are used to support the cutting wheels, an excessively large amount of overlap is necessary, of the order of 1/32 of an inch, in order to allow for relatively large shaft deflection as well as the clearance between the shaft and the inside diameters of the cutting wheels. Such large overlap of the cutting wheels results in a permanent deformation of the material being slit, thereby resulting in uneven rewound rolls and, in many cases, uneven widths of the slit strips.

An object of this invention is the provision of improved apparatus for slitting metal foil and sheet, wherein a plurality of rotatable cutting members are carried by a shaft having a diameter which is independent of the width of the machine incorporating the apparatus.

An object of this invention is the provision of metal foil and sheet slitting apparatus of the class having two sets of cutting wheels carried by spaced shafts, which apparatus includes means for maintaining a minimum overlap of the cutting wheels in a practical, economical and reliable manner.

An object of this invention is the provision of metal foil and sheet slitting apparatus comprising spaced shafts each carrying a set of cutting wheels, means to adjust the amount of overlap between the sets of cutting wheels, and driven back-up rolls in peripheral engagement with the cutting wheels and urging the two sets of cutting wheels toward each other.

These and other objects and advantages of the invention will become apparent from the following description when taken with the accompanying drawings. It will be understood, however, that the drawings are for purposes of illustration and are not to be construed as defining the scope or limits of the invention, reference being had for the lattter purpose of the claims appended hereto.

In the drawings wherein like reference characters denote like parts in the several views:

FIGURE 3 is an enlarged, fragmentary, end elevational view taken along the plane A—A of FIGURE 1 and showing the components forming the slitting apparatus of the machine, with certain parts broken away and certain parts shown in section;

FIGURE 4 is a cross-sectional view taken along the line IV—IV of FIGURE 3;

FIGURE 5 is similar to FIGURE 3 but taken along the plane B—B of FIGURE 2 to show the components forming the slitting apparatus made in accordance with this embodiment of the invention; and FIGURE 6 is a cross-sectional view taken along the line VI—VI of FIGURE 5.

Figure 1:
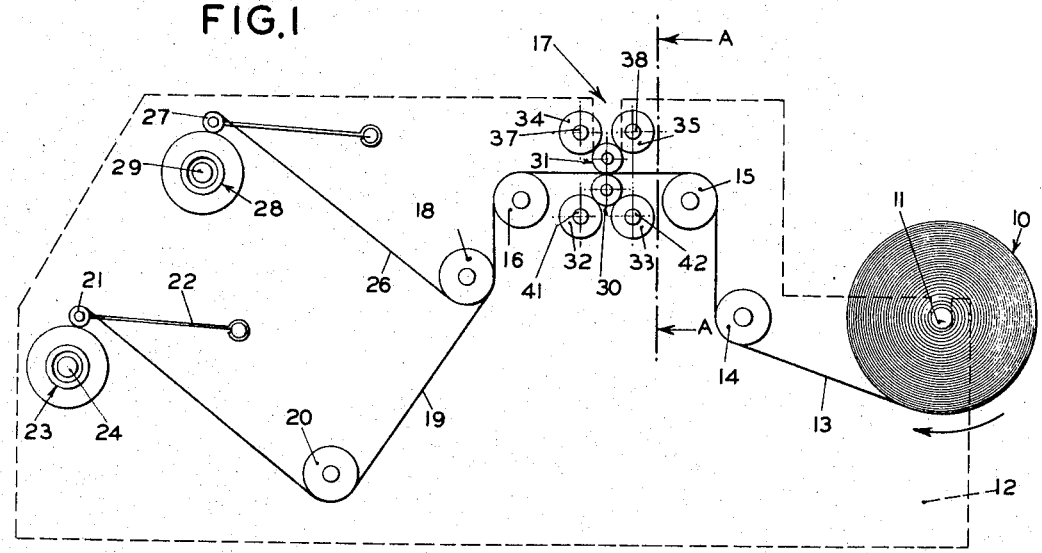
FIGURE 1 is a diagrammatic representation, in side elevation, showing one embodiment of this invention incorporated in a slitting and rewinding machine.

Reference now is made to FIGURE 1, which shows a slitting and rewinding machine of the type to which this invention is directed. A supply roll 10 of, say, aluminum foil, is carried on a shaft 11 rotatably supported by the frame 12 of the machine. The foil 13 is passed around a first idler roll 14 and over a pair of driven pull rolls 15 and 16 disposed at opposite sides of the slitting station 17. As will be described in detail hereinbelow, the foil is slit, at the slitting station, into a plurality of relatively narrow strips, which strips pass around a second idler roll 18. The forward edge strip, as viewed in FIGURE 1 and identified by the numeral 19, passes under an idler roll 20, and around a top riding roll 21 which is rotatable about a shaft carried by a pivotally-mounted arm 22. Such strip is wound on a core 23 carried by a motor-driven mandrel 24. The adjacent strip 26 passes around a similar pivotally-mounted top riding roll 27 and is wound on a core 28 carried by the motor-driven mandrel 29.

The mandrel 24 carries a plurality of cores, each having a riding roll associated therewith. Assuming that the cut strips are all of the same width, the axial spacing of these cores is equal to the strip width. As is well known in this art, each core is rotated by means of friction washers mechanically keyed to the mandrel and the arrangement is such that each core can slip relative to the mandrel in correspondence with changes in the tension of the strip being wound thereon. This arrangement, commonly referred to as differential winding, results in uniformly wound rolls of the cut foil. The individual riding rolls remain in peripheral contact with the associated strip throughout the winding operation, thereby resulting in smoothly wound rolls. The other mandrel 29 also carries a plurality of cores similarly arranged for differential winding, each core having a riding roll associated therewith.

In accordance with one embodiment of this invention, the slitting station 17 comprises spaced, parallel shafts, each shaft carrying a plurality of steel cutting wheels (such as the wheels 30 and 31 visible in the particular view of FIGURE 1), and four driven back-up rolls 32–35, which rolls are of relatively high rigidity, are carried by the machine frame and cradle the assembly of cutting wheels. The construction and operative assembly of these components will best be understood by reference to FIGURES 3 and 4. The upper back-up rolls 34 and 35 have reduced-diameter ends 37 and 38 passing though individual bearings carried by the machine frame 12, such as the bearing 39 visible in FIGURE 3. The lower back-up rolls 32 and 33 have similar reduced diameter ends 41 and 42 passing through similar bearings, only the bearing 40 being visible in this view. By means of a suitable gearing system, or timing belt, not shown, the four back-up rolls are rotated at the same predetermined speed in the directions indicated by the arrows in FIGURE 4.

The upper set of cutting wheels is carried by a shaft 45 which is freely rotatably in end bearings supported by adjustable spacer blocks carried by the machine frame, the left end bearing 46 and associated spacer block 47 being visible in FIGURE 3. The shaft 45 carries the cutting wheels 31, spacers 31′ and a locating collar 48 at each end. These locating collars are secured to the shaft by means of set screws, not shown, and serve to position the cutting wheels and spacers on the shaft as well as to retain them under axial pressure, whereby the cutting wheels, spacers and shaft rotate as a unit.

The lower set of cutting wheels 30, spacers 30′ and locating collars 50 are carried by the shaft 51 which also is freely rotatable in end bearings supported by adjustable spacer blocks carried by the machine frame, the end bearing 52 and spacer block 53 being visible in the showing of FIGURE 3. It will be noted that the cutting wheels 30, carried by the lower shaft 51, are aligned with and spaced from the spacers 31′ carried by the upper shaft 45. Similarly, the cutting wheels 31, carried by the upper shaft 45, are aligned with and spaced from the spacers 30′ carried by the lower shaft. Consequently, the peripheral surfaces of the cutting wheels carried by the one shaft overlap the peripheral surfaces of the cutting wheels carried by the other shaft. The amount of such overlap can be set to a desired value by adjusting the locating blocks 47 and 53 relative to each other.

Referring again to FIGURE 1, as the web 13 is pulled from the supply roll 10 (by the pull rolls 15 and 16 which are driven in synchronism so that the surface speed is slightly less than that of the four back-up rolls 32-35), the web is sheared by the cutting wheels into strips having widths corresponding to those of the cutting wheels. These cutting wheels rotate, being driven by the back-up rolls and by movement of the material being slit.

By cradling the cutting wheel assemblies by the back-up rolls, the wheel-supporting shafts 45 and 51 (see FIGURES 3 and 4) can be of relatively small diameter since they are prevented from deflecting or deforming in any direction. The use of such small diameter shafts permits the use of small diameter cutting wheels which results not only in manufacturing economy but, more importantly, reduces the surface area of contact between the cutting wheels and the foil, thereby resulting in a clean shearing action with no pressure distortion of the foil along the shearing lines. It will also be apparent that with this type of construction, wherein the back-up rolls are in surface contact with the cutting wheels, the overlap of the cutting wheels is completely independent of the amount of clearance between the supporting shaft and the inside diameter of the wheels. Thus, the tolerances on the shaft diameter and roundness, on the cutting wheel inside diameter, and on the concentricity between the inner and outer diameters of the cutting wheel, may all be increased while still resulting in a closer overlap tolerance than can be obtained economically and reliably with present foil slitting arrangements. The advantage of maintaining a small overlap of the cutting wheels is the minimizing of metal deformation during the shearing operation, whereby tighter tolerances may be held on the width of the slit strips, the cut edges are smoother, and, finally, the rewound rolls always are of good quality.

In the description of the slitting apparatus shown in FIGURES 1, 3 and 4, reference has been made to a thin metal foil rolled into a supply roll 10. It will be apparent, however, that this form of the apparatus may be used for slitting metal-to-metal and metal-to-paper laminates of any thickness up to such maximum that the material can be coiled into roll form, as well as flat sheet metal and other material that may be slit by shearing. The four back-up rolls are so disposed relative to the cutting wheels that the wheels and their supporting shafts are restrained against movement in any direction. Thus, the horizontal component of the shearing force, which component increases with the thickness and hardness of the particular material to be slit, cannot deform or deflect either of the cutting wheel supporting shafts in such direction.

Figure 2:
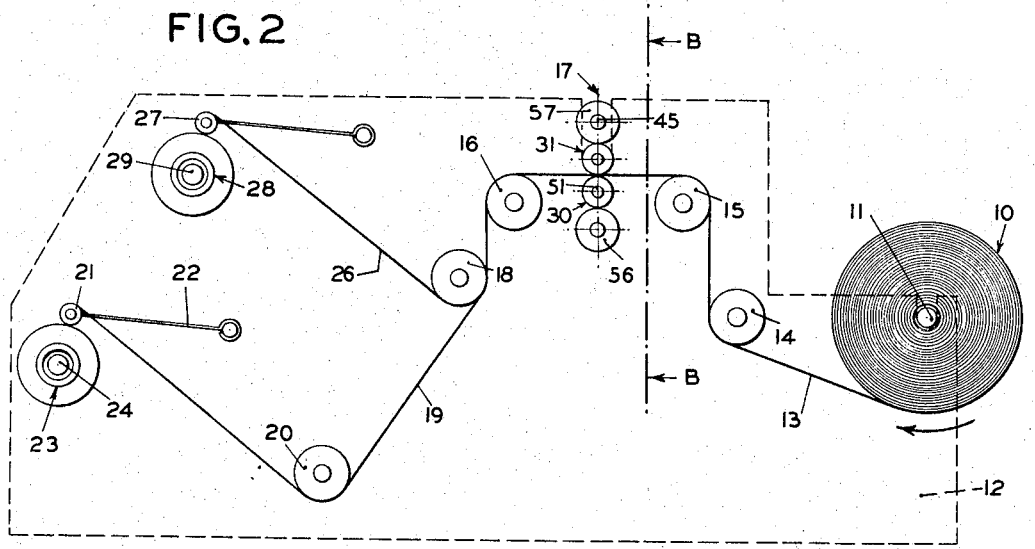
FIGURE 2 is a similar view showing another embodiment of the invention.

A simplified embodiment of the slitting apparatus is shown in FIGURES 2, 5 and 6. Specifically, only two back-up rolls 56 and 57 are used and these rolls are in vertical alignment with the shafts 51 and 45 carrying the two sets of cutting wheels 30 and 31 and spacers 30′ and 31′, respectively. These shafts are adjustably settable relative to each other by means of the locating blocks 47 and 53, thereby to set the amount of overlap between the two sets of cutting wheels. Each back-up roll is in peripheral surface engagement with the associated cutting wheels, whereby the wheel-carrying shafts 45 and 51 are restrained against deflection or deformation in a vertical plane. However, the cutting wheel shafts are unrestrained against deflection in the horizontal plane, that is, the plane of the foil is indicated by the arrow 55 in FIGURE 6. Consequently, this arrangement is useful for slitting foil or other thin gauge materials as the slitting of such materials requires only a small shearing force which generates a still smaller force component in the horizontal direction. For practical purposes, this small component force may be neglected in this particular embodiment of the invention.

Although the slitting members have been illustrated and described as cutting wheels of equal thickness, it will be apparent that the invention may be used with cutting members of various types and configurations. Also, it is common practice, in this art, to refer to such cutting members as knives and, therefore, it is intended that the term knives, in the claims, refers to any form of cutting member which is adapted for slitting material by a shearing action.

Having now given a detailed description of the invention and its advantages, those skilled in this art will be able to make various changes and modifications without thereby departing from the spirit and scope of the invention as set forth in the following claims.

I claim:
1. In slitting apparatus of the class having two sets of cutting knives carried by two spaced, parallel supporting shafts, the improvement wherein all of the cutting knives of one set are pressure-biased toward all of the knives of the second set by opposed, rotatable back-up rolls in peripheral contact with the knives, said back-up rolls being of relatively high rigidity.

2. Slitting apparatus comprising,
 (a) a pair of spaced, parallel, freely-rotatable, supporting shafts,
 (b) a first set of cutting knives and spacers alternately disposed on one of the said shafts and rotatable therewith, said knives having a diameter exceeding that of the spacers,
 (c) a second set of similar cutting knives and spacers similarly carried by the other of the said shafts, each of these knives and spacers being aligned respectively with the spacers and knives of the said first set,
 (d) means spacing the said shafts so that the peripheral surfaces of the two sets of knives overlap, and
 (e) at least one driven back-up roll in peripheral engagement with each set of cutting knives.

3. The invention as recited in claim 2, wherein there is a first pair of spaced back-up rolls in peripheral engagement with all of the cutting knives of said first set, a second pair of spaced back-up rolls in peripheral engagement with all of the cutting knives of said second set, and wherein each said pair of back-up rolls is symmetrically disposed with respect to the associate supporting shaft.

4. The invention as recited in claim 2, wherein the diameters of said supporting shafts are substantially less than the diameters of the back-up rolls.

5. The invention as recited in claim 2, wherein the overlap of the peripheral surfaces of two sets of cutting knives has a minimum value regardless of the thickness of the particular material to be slit, such minimum value being that which is necessary to slit the material.

6. Foil and sheet slitting apparatus comprising,
(a) a pair of spaced, supporting shafts,
(b) bearing means supporting said shafts for rotation about parallel axes,
(c) a first set of cutting knives and spacers alternately disposed on one of the supporting shafts and rotatable therewith, said knives having a diameter exceeding that of the spacers,
(d) a second set of similar cutting knives and spacers similarly carried by the other of the supporting shafts, each of these cutting knives and spacers being transversely aligned respectively with the spacers and cutting knives of the said first set,
(e) adjustable mounting means supporting the said bearing means thereby to set the extent to which the peripheral surfaces of the two sets of knives overlap,
(f) a first pair of rigid, driven back-up rolls disposed on opposite sides of the said one supporting shaft, each back-up roll being in peripheral engagement with all of the knives carried by the said one supporting shaft, and
(g) a second pair of rigid, driven back-up rolls disposed on opposite sides of the said other supporting shaft, each back-up roll being in peripheral engagement with all of the knives carried by the said other supporting shaft.

References Cited

UNITED STATES PATENTS

| | | | |
|---|---|---|---|
| 940,862 | 11/1909 | Daniel et al. | 83—501 |
| 1,700,054 | 1/1929 | Iversen | 72—241 |
| 2,159,337 | 5/1939 | McBain | 72—241 |
| 2,698,661 | 1/1955 | MacQuarrie | 83—503 X |
| 3,148,565 | 9/1964 | Hunter | 72—241 |

JAMES M. MEISTER, *Primary Examiner.*